United States Patent

Mecca

[11] 4,197,127
[45] Apr. 8, 1980

[54] PHOTOGRAPHIC SILVER HALIDE COMPOSITION AND ELEMENT CONTAINING SULFONATE COPOLYMERS

[75] Inventor: Thomas G. Mecca, Rochester, N.Y.

[73] Assignee: Eastman Kodak Company, Rochester, N.Y.

[21] Appl. No.: 936,996

[22] Filed: Aug. 25, 1978

Related U.S. Application Data

[63] Continuation of Ser. No. 731,051, Oct. 8, 1976, abandoned.

[51] Int. Cl.$^2$ .................. G03C 1/72; G03C 1/76
[52] U.S. Cl. .................... 430/628; 430/502
[58] Field of Search ................ 96/114, 67, 68

[56] References Cited

U.S. PATENT DOCUMENTS

| 2,772,163 | 11/1956 | Tong | 96/97 |
| 2,852,386 | 9/1958 | Tong | 96/114 |
| 3,411,911 | 11/1968 | Dykstra | 96/114 |
| 3,536,491 | 10/1970 | Rees et al. | 96/87 R |
| 3,926,436 | 12/1975 | Monbaliu et al. | 96/67 |

Primary Examiner—Jack P. Brammer
Attorney, Agent, or Firm—Arthur H. Rosenstein

[57] ABSTRACT

Disclosed herein are compositions useful for the preparation of flexible coatings, particularly to photographic materials, which have improved stability to organic solvents and dissolved salts. The compositions comprise an aqueous dispersion of a hydrophilic colloid and a copolymer having a glass transition temperature less than or equal to 60° C. comprising: from about 50 to about 70 percent by weight of an ester of an ethylenically unsaturated carboxylic acid; from about 2 to about 18 percent by weight of an amide of an ethylenically unsaturated carboxylic acid; from about 10 to about 30 percent by weight of a vinyl benzene; and from about 2 to about 18 percent by weight of a sulfonate monomer having the formula

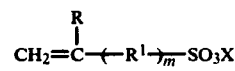

wherein R is hydrogen or alkyl; $R^1$ is selected from the group consisting of alkylene and

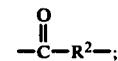

$R^2$ is amino substituted with alkyl or hydrogen, or $-(CH_2)_nO-$ wherein n is an integer from 0 to 5; m is either 0 or 1; and X is hydrogen or a monovalent cation.

24 Claims, No Drawings

PHOTOGRAPHIC SILVER HALIDE COMPOSITION AND ELEMENT CONTAINING SULFONATE COPOLYMERS

This is a continuation of application Ser. No. 731,051, filed Oct. 8, 1976, now abandoned.

BACKGROUND OF THE INVENTION

1. Field of the Invention

This invention relates to photographic materials, their preparation and their use. In particular, this invention relates to the preparation and use of latex copolymers of the acrylic type to improve the physical properties of photographic layers containing hydrophilic colloids. The copolymers disclosed herein impart added stability to photographic emulsions and cause desirable increased photographic speed and improved contrast, as well as dye hue shifts in color reversal-type photographic materials.

2. Description of the Prior Art

Proteinaceous hydrophilic colloids are known to be useful in many connections, particularly those of a photographic nature, due to the optical clarity of attenuated products which may be prepared therefrom. Gelatin or gelatin derivatives, for example, are typical of the hydrophilic colloids which have been found to be useful in this respect.

However, their colloids exhibit physical properties which are objectionable in certain applications. Many of these objections have been met by mixing or "extending" the colloid with one or more synthetic materials such as synthetic polymers. Exemplary of the art showing the use of polymers with colloids such as gelatin to overcome various problems are U.S. Pat. No. 3,411,911 (Dykstra), issued Nov. 19, 1968; U.S. Pat. No. 3,536,491 (Rees et al), issued Oct. 27, 1970; U.S. Pat. No. 3,628,957 (Franco et al), issued Dec. 21, 1971; U.S. Pat. No. 3,700,456 (Smith), issued Oct. 24, 1972; U.S. Pat. No. 3,745,007 (Nagae et al), issued July 10, 1973; U.S. Pat. No. 3,811,897 (Babbit et al), issued May 21, 1974; British Specification No. 1,147,139, published Apr. 2, 1969; British Specification No. 1,178,177, published Jan. 21, 1970; and British Specification No. 1,351,767, published May 1, 1974.

In particular, U.S. Pat. Nos. 2,739,137 (Fowler), issued Mar. 20, 1956; 2,772,163 (Tong), issued Nov. 27, 1956; and 2,852,386 (Tong), issued Sept. 16, 1958 disclose the preparation of hydrosols comprising copolymers of unsaturated aliphatic amides, acrylic acid esters and a styrene compound and their use in photographic emulsions to disperse color couplers and to improve the flexibility of gelatin and like colloids. British Pat. No. 1,181,508, published Feb. 18, 1970 and its addition, published Feb. 18, 1970 relates to a gelatin extender which is a copolymer comprising two acrylic acid esters, one of which has an active methylene group in an alcohol moiety of the ester or a substituent and a sulfoester monomer. The copolymers can be crosslinked through the active methylene groups to provide stability to the gelatin binder. These polymers, however, have been shown to be susceptible to the formation of microscopic and macroscopic agglomerates when treated with water-miscible solvents or water-soluble salts. The compositions of the present invention have unexpectedly overcome these stability problems.

Sulfoester monomers have been copolymerized with other ethylenically unsaturated monomers for various purposes. Particularly, acrylamidosulfonates have been homopolymerized and copolymerized with acrylonitriles for use as water-soluble films and as textile fibers, as disclosed in U.S. Pat. Nos. 2,983,712 (Wilkinson), issued May 9, 1961; 3,332,904 (La Combe et al), issued July 25, 1967; and 3,506,707 (Miller et al), issued Apr. 14, 1970. U.S. Pat. No. 3,547,899 (Arlt et al), issued Dec. 15, 1970 and British Specification No. 1,197,323, published July 1, 1970 disclose the copolymerization of acrylamidosulfonates with a variety of monomers, including alkyl esters and styrene to prepare copolymers useful as films and fibers showing a high degree of whiteness and an outstanding affinity for basic dyes. These references teach no photographic uses for these polymers.

Many latex polymers which are used as gelatin extenders, particularly those disclosed by U.S. Pat. Nos. 2,739,137 (Fowler); 2,772,163 (Tong); and 2,852,386 (Tong), are susceptible to gelatin-latex agglomeration and coagulation caused by salts and organic solvents. This agglomeration in coating melts leads to limited melt stability, excessive filter plugging and coating defects commonly referred to as "double-ended comets." Further, due to this agglomeration, partially-used melts cannot be sent to storage for reuse at a later time. The result is considerable waste and less than optimum flexibility in preparing melts and scheduling emulsion coating machines.

Hence, there is a continuing search for latex polymers which can be used as gelatin extenders which are not susceptible to the problems disclosed hereinabove. These polymers must be stable to organic solvents and dissolved salts normally used in photographic emulsions.

SUMMARY OF THE INVENTION

In accordance with this invention, it has been found that particular sulfonate containing latex copolymers are unexpectedly more stable in the presence of organic solvents or dissolved salts when used with hydrophilic colloids to prepare flexible coatings than polymers previously used in the art for this purpose. In addition, the resulting polymers surprisingly impart a high desirable increase in photographic speed and an improvement in contrast, as well as dye hue shifts in color photographic materials.

In one aspect of the present invention, a composition useful for the preparation of flexible coatings comprises an aqueous dispersion of a hydrophilic colloid and a copolymer having a glass transition temperature less than or equal to 60° C. comprising from about 50 to about 70 percent by weight of an ester of an ethylenically unsaturated carboxylic acid; from about 2 to about 18 percent by weight of an amide of an ethylenically unsaturated carboxylic acid; from about 10 to about 30 percent by weight of a vinyl benzene; and from about 2 to about 18 percent by weight of a sulfonate monomer having the formula (I):

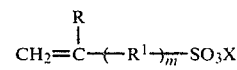

such that the total amount of amide and sulfonate monomers is less than about 20 percent by weight of the total polymer weight, wherein R is hydrogen or alkyl; $R^1$ is selected from the group consisting of alkylene and

$R^2$ is amino substituted with alkyl or hydrogen, or $-(CH_2)_nO-$ wherein n is an integer from 0 to 5; m is either 0 or 1; and X is hydrogen or a monovalent cation.

In another aspect of the present invention, a photographic element comprises a support having thereon at least one silver halide emulsion layer and at least one layer comprising an aqueous dispersion of a hydrophilic colloid and copolymer having a glass transition temperature less than or equal to 60° C. comprising from about 50 to about 70 percent by weight of an ester of an ethylenically unsaturated carboxylic acid; from about 2 to about 18 percent by weight of an amide of an ethylenically unsaturated carboxylic acid; from about 10 to about 30 percent by weight of a vinyl benzene; and from about 2 to about 18 percent by weight of a sulfonate monomer having the formula (I) described hereinabove, such that the total amount of amide and sulfonate monomers is less than about 20 percent by weight of the total polymer weight.

DESCRIPTION OF THE PREFERRED EMBODIMENTS

As described hereinabove, in one aspect of the present invention, a composition useful for the preparation of flexible coatings comprises an aqueous dispersion of a hydrophilic colloid and a copolymer having a glass transition temperature less than or equal to 60° C. comprising from about 2 to about 18 percent by weight of a sulfonate monomer having the formula (I):

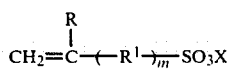

wherein m is 0 or 1; R is hydrogen or alkyl, preferably from 1 to 10 carbon atoms, such as methyl, ethyl, propyl, butyl, pentyl, hexyl and the like and isomers thereof; $R^1$ can be alkylene, preferably of from 1 to 10 carbon atoms, such as methylene, ethylene, propylene, isopropylene, butylene, isobutylene and the like and can be substituted with a variety of substituents. $R^1$ can also be

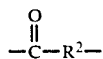

wherein $R^2$ is amino having the formula

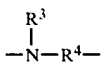

wherein $R^3$ is hydrogen or a branched or linear alkyl having from 1 to 10 carbon atoms, such as methyl, ethyl, propyl, hexyl, isobutyl, t-butyl, and the like. $R^4$ is a branched or linear alkylene having from 1 to 10 carbon atoms, such as methylene, ethylene, propylene, isobutylene and the like. $R^2$ can also be $-(CH_2)_nO-$ wherein n is an integer from 0 to 5.

X is hydrogen or a monovalent cation, such as an alkali metal cation as exemplified by lithium, sodium, potassium, rubidium and the like; copper (I), and others known to those skilled in the art.

Exemplary of sulfonate monomers useful in the preparation of the copolymers described herein are sodium 2-acrylamido-2-methylpropane sulfonate, sodium 2-acrylamido-2,2-dimethylpropane sulfonate, sodium 2-methacrylamido-2-methylpropane sulfonate, sodium 2-methacrylamido-2,2-dimethylpropane sulfonate, 2-acrylamido-2-methylpropane sulfonic acid, 2-acrylamido-2-ethylpropane sulfonic acid, sodium 2-acrylamido-2-ethylpropane sulfonate, sodium vinyl sulfonate, potassium vinyl sulfonate, sodium 2-propenyl sulfonate,

and the like.

As noted above, from about 50 to about 70 percent by weight of the copolymers useful in the present invention can comprise an ester of an ethylenically unsaturated carboxylic acid. As exemplary of such monomers may be listed: methyl acrylate, ethyl acrylate, propyl acrylate, n-butyl acrylate, and other alkyl acrylates; 2-hydroxyethyl acrylate, 2-hydroxypropyl acrylate and other hydroxyalkyl acrylates; methyl methacrylate, ethyl methacrylate, propyl methacrylate, n-butyl methacrylate and other alkyl methacrylates; 2-hydroxyethyl methacrylate, 2-hydroxypropyl methacrylate and other hydroxyalkyl methacrylates; esters of (m- and p-vinylphenyl) acetic acid, m- and p-vinylbenzoic acid, 3-acrylamido-3-methylbutanoic acid and other ethylenically unsaturated carboxylic acids.

Preferred monomers include alkyl esters of acrylic acid such as methyl acrylate, ethyl acrylate, propyl acrylate, n-butyl acrylate and the like.

In addition, from about 2 to about 18 percent by weight of the copolymers described herein can comprise an amide of an ethylenically unsaturated carboxylic acid. Exemplary of such monomers are; acrylamide, methacrylamide, N-isopropylacrylamide, N-(1,1-dimethyl-3-dimethylaminopropyl)acrylamide, N-t-butylacrylamide, diacetoneacrylamide and the like.

Further, as noted above, from about 10 to about 30 percent by weight of the copolymers useful in the present invention can comprise a vinyl benzene. Such monomers include styrene, vinyltoluene, α-methylstyrene, p-bromostyrene, p-t-butylstyrene, styrene sulfonic acid, sodium salt, and other substituted styrenes.

Examples of copolymers useful herein include a copolymer of n-butyl acrylate (40–60 weight percent), methacrylamide (4–15 weight percent), styrene (10–30 weight percent) and sodium 2-acrylamido-2-methylpropane sulfonate (2–18 weight percent); poly(butyl acrylate-co-styrene-co-sodium vinyl sulfonate-co-methacrylamide) (58.8:25.2:8:8 weight ratio); and poly(methyl acrylate-co-styrene-co-sodium 2-acrylamido-2-methyl propane sulfonate-co-methacrylamide) (58.8:25.2:8:8 weight ratio).

The sulfonate monomers useful in the present invention can be obtained from commercial sources or prepared by the techniques disclosed in U.S. Pat. No. 2,983,712 (Wilkinson), issued May 9, 1961; U.S. Pat. No. 3,332,904 (La Combe et al), issued July 25, 1967; and U.S. Pat. No. 3,506,707 (Miller et al), issued Apr. 14, 1970. The other monomers useful in preparing the copolymers described herein are either commercially available or prepared by methods known to those skilled in the art.

The glass transition temperatures (Tg), as used in this invention and set forth in this specification, unless otherwise specified, can be determined by differential scanning calorimetry as disclosed in "Techniques and Methods of Polymer Evaluation," Vol. 2, Marcel Dekker, Inc., N.Y. 1970. The glass transition temperatures of the copolymers described herein are less than or equal to 60° C., and preferably from about −20° C. to about +10° C.

The molecular weights of the copolymers useful in the present invention are subject to wide variation, but are often in the range of about $10^4$ to about $10^6$. These copolymers preferably have inherent viscosities (0.25 g polymer in 100 ml acetic acid at 25° C.) of from about 0.3 to about 0.9, and more preferably from about 0.4 to about 0.6. As used herein, the term "inherent viscosity" is determined by the formula $$\mu\text{inh} = (2.30 \log \mu\text{rel})/C$$

wherein $\mu$inh is the inherent viscosity, $\mu$rel is the relative viscosity of acetic acid solution of the polymer and C is the concentration in grams (0.25) of polymer per 100 cc of solution.

The latex copolymers useful in the present invention can be prepared by well known polymerization techniques. The preferred methods include variations of emulsion polymerization such as batch, semi-continuous and continuous polymerization methods. Preparation 1 shows one semi-continuous method of making the latex copolymer by premixing the monomers in a head tank with a suitable surface active agent to make a fairly homogeneous monomer mixture. This mixture is then added to an aqueous solution of surface active agent and catalyst in a reactor vessel. The time period for addition can be from 10 to 120 minutes, preferably 30 minutes, and is varied to produce different physical properties in the interpolymer, such as molecular weight.

The temperature at which the polymers described herein are prepared is subject to wide variation since this temperature depends upon such variable features as the specific monomers used, duration of heating, pressure employed and like considerations. However, the polymerization temperature generally does not exceed about 110° C., and most often it is in the range of about 50° to about 100° C. The pressure employed in the polymerization is usually only sufficient to maintain the reaction mixture in liquid form, although either superatmospheric or subatmospheric pressures can be used where such is advantageous. The concentration of polymerizable monomers in the polymerization mixture can be varied widely with concentrations up to about 100% by weight and preferably from about 20 to about 70% by weight based on the weight of the polymerization mixture, being satisfactory. Suitable catalysts for the polymerization reaction include, for example, from about 0.1 to about 2.0 percent by weight, based on the total monomer weight, of a free radical catalyst, such as hydrogen peroxide, a salt of peroxydisulfate, cumene hydroperoxide, water soluble azo type initiators and the like. In redox polymerization systems conventional ingredients can be employed, such as potassium persulfate and potassium meta bisulfite and others known in the art. If desired, the polymer can be isolated from the reaction medium by freezing, salting out, precipitation or any other procedure suitable for this purpose.

In some instances, it may be advantageous to include from about 0.5 to about 4 percent by weight, based on the total monomer weight, of a surface active agent or compatible mixtures of such agents in the preparation of the copolymers of the present invention. Suitable wetting agents include the non-ionic, ionic and amphoteric types as exemplified by the polyoxyalkylene derivatives, amphoteric amino acid dispersing agents, including sulfobetaines and the like. Such wetting agents are disclosed in U.S. Pat. No. 2,600,831, issued June 17, 1952; U.S. Pat. No. 2,271,623, issued Feb. 3, 1942, U.S. Pat. No. 2,275,727, issued Mar. 10, 1942 and U.S. Pat. No. 2,787,604, issued Apr. 2, 1957; U.S. Pat. No. 2,816,920, issued Dec. 17, 1957 and U.S. Pat. No. 2,739,891, issued Mar. 27, 1956. Commercially-available surfactants such as DuPont's Doponol ME and Olin Mathieson's Surfactant 10G are also useful.

The compositions of the present invention comprise an aqueous dispersion of a copolymer as described hereinabove and a hydrophilic colloid and preferably proteinaceous colloids. Exemplary of such colloids include: gelatin, protein derivatives, such as carboxymethylated proteins, colloidal albumin, cellulose derivatives, poly(-vinyl pyrrolidones) and other water soluble polymers. The colloid usually comprises from about 10 to about 90 weight percent of the total composition weight.

In a preferred embodiment of the present invention, the described compositions additionally comprise from about 30 to about 70 weight percent of the total composition weight of a light sensitive silver halide, such as silver chloride, silver bromide, silver chlorobromide, silver iodide, silver bromoiodide, and the like and mixtures thereof. Dispersions of the photographic silver halide and the sulfonate copolymers described herein in combination with a hydrophilic colloid, such as gelatin, can be made in a variety of ways. For example, an aqueous gelatin dispersion of the photographic silver halide can be mixed with an aqueous dispersion or solution of the sulfonate copolymer. Alternatively, the photographic silver halide can be precipitated in an aqueous dispersion or solution of the copolymer with or without another colloid, depending upon the dispersion characteristics of the copolymer. In this case, a water-soluble salt such as silver nitrate is admixed with a water-soluble halide such as potassium bromide in the presence of the mixture. In still another procedure, the photographic silver halide is precipitated in an aqueous gelatin solution and digested in the conventional manner known to the art. After digestion, but prior to coating there is added to the emulsion an aqueous dispersion of the copolymer. The bulk of the resulting dispersion can be increased by the addition of more of the copolymers and/or natural or synthetic colloids or other binding agents suitable for use in photographic silver halide emulsions. Generally, the concentration of the copolymers described herein in the compositions of the present invention will be in the range of from about 10 to about 90 percent by weight, more preferably in the range of about 30 to about 60 percent weight, based on the total composition weight.

Where the compositions are used in photographic elements in layers other than the silver halide emulsion layers, for example, in filter layers, antihalation layers, antiabrasion layers, antistatic layers, barrier layers, receiving layers for diffusion transfer processes and the like, they can be used as the sole vehicle or in admixture with natural or synthetic colloids such as are mentioned hereinbefore.

The compositions described herein can be coated on a wide variety of supports, including film bases such as polyethylene terephthalate, cellulose acetate butyrate, polycarbonate, polyolefins (e.g., polyethylene, polypropylene) and the like. When such film bases are used, the photographic product obtained can be used, for example, as a transparency. If desired, the compositions can be coated on an opaque support such as paper, polyolefin coated paper such as polyethylene or polypropylene coated paper which can be pigmented, with $TiO_2$, for example, the electron bombarded or exposed to a corona discharge to promote emulsion adhesion. When such supports are used, a color photographic print may be obtained.

The emulsions containing the copolymers described herein can be chemically sensitized with compounds of the sulfur group as described in Sheppard et al U.S. Pat. No. 1,623,499, issued Apr. 5, 1927, noble metal salts such as gold salts, reduction sensitized with reducing agents, and combinations of these. The emulsion layer and other layers present in photographic elements made according to this invention can be hardened with any suitable hardener such as aldehydes, bis(vinylsulfonyl) compounds, mucochloric acid and the like, aziridine hardeners, hardeners which are derivatives of dioxane, oxypolysaccharides such as oxystarch, oxy plant gums and the like. Useful concentrations of hardeners are related to the amount of binder used and are known to those skilled in the art. Such hardened layers will have a melting point in water greater than about 65° C. and preferably greater than 90° C.

The emulsion can also contain additional additives, particularly those known to be beneficial in photographic emulsions, including for example, water-miscible and water-immiscible organic solvents, such as alcohols, ketones, carboxylic acids and their esters and the like, stabilizers or antifoggants, particularly the water-soluble inorganic acid salts of cadmium, cobalt, manganese and zinc as disclosed in U.S. Pat. No. 2,829,404, the substituted triazaindolizines as disclosed in U.S. Pat. Nos. 2,444,605 and 2,444,607, speed increasing materials, soluble inorganic salts, such as potassium bromide, sodium chloride, sodium acetate and the like, absorbing dyes, plasticizers and the like. Sensitizers which give particularly good results in the photographic compositions disclosed herein are the alkylene oxide polymers which can be employed alone or in combination with other materials, such as quaternary ammonium salts, as disclosed in U.S. Pat. No. 2,886,437 or with mercury compounds and nitrogen containing compounds, as disclosed in U.S. Pat. No. 2,751,299.

The compositions described herein can be used in various kinds of photographic compositions and elements, including direct positive silver halide emulsions, X-ray and other non-spectrally sensitized emulsions as well as in orthochromatic, panchromatic and infrared sensitive emulsions, particularly those sensitized with merocyanine dyes, cyanine dyes, carbocyanine dyes and the like. Furthermore, these compositions can be used in emulsions comprising color forming materials or emulsions developed by solutions containing couplers or other color generating materials. In addition, they can be used in photographic emulsions containing developers, e.g., polyhydroxybenzenes, as well as in emulsions intended for use in diffusion transfer processes which utilize the non-developed silver halide in the non-image areas of the negative to form a positive by dissolving the undeveloped silver halide and precipitating it on a receiving layer in close proximity to the original silver halide emulsion layer. Such processes are described in U.S. Pat. No. 2,352,014 (Rott), U.S. Pat. No. 2,543,181 (Land) and U.S. Pat. No. 3,020,155 (Yackel et al).

The sulfonate copolymers disclosed herein are useful in photographic image-transfer film units such as in image-transfer film units as described, for example, in U.S. Pat. Nos. 2,543,181; 2,983,606; 3,227,550; 3,227,552; 3,415,695; 3,415,644; 3,415,646 and 3,635,707; Canadian Pat. No. 674,082; Belgian Pat. Nos. 757,959 and 757,960, both issued Apr. 23, 1971; British Pat. Nos. 904,364 and 840,731; and German Pat. No. 2,242,762.

The compositions of the present invention can be used in individual layers of a multilayer photographic element over a broad range of coating coverages, e.g., from about 0.001 $g/m^2$ to about 0.5 $g/m^2$ of support, and preferably from about 0.05 $g/m^2$ to about 0.3 $g/m^2$ of support.

These compositions are particularly useful in color reversal-type photographic elements because the latex sulfonate copolymers incorporated therein impart a desirable decrease in the brittleness of the layers and a hue shift of the dyes in the elements. By hue shift is meant that the intensity and absorption maxima of the imaging dyes in the multilayers of photographic elements are shifted with a concurrent increase in speed and contrast relative to an element having the same multilayers but with no sulfonate copolymer.

The following examples are included for a further understanding of the present invention.

PREPARATION 1:

Poly(butyl acrylate-co-styrene-co-sodium 2-acrylamido-2-methylpropane sulfonate-co-methacrylate) (58.8:25.2:8.0:8.0 weight ratio)

This polymer latex was prepared by the following procedure:

Distilled water (528 kg) and Duponol Me* (sodium lauryl sulfate surface active agent) (1.7 kg) were added to a reactor vessel. This solution was thoroughly purged with nitrogen and heated to about 90° C. with a slight nitrogen purge.
*Trademark of E. I. DuPont de Nemours, Inc.

A 10% by weight aqueous solution of sodium 2-acrylamido-2-methylpropane sulfonate (132 kg); surfactant Duponol ME* (1.7 kg); and methacrylamide (13.3 kg) were added to a head tank with moderate stirring. Butyl acrylate (100 kg) and styrene (42.5 kg) were then added to this and the monomer emulsion in the head tank was continuously stirred for 20 minutes.
*Trademark of E. I. DuPont de Nemours, Inc.

Potassium persulfate catalyst (0.85 kg) was added to the contents in the reactor vessel and the addition of the emulsion in the head tank was begun within 2 minutes following the catalyst addition. The emulsion was added to the reactor continuously over a 30 minute period. The reactor vessel contents were kept at 92°–95° C. during this time. Following reaction of the monomer emulsion, the reactor contents were cooled to 85° C. and polymerization was allowed to proceed for 30 minutes.

After reaction, the temperature was further lowered to 75° C. and residual monomer was removed by vacuum distillation. The resulting latex was cooled to room temperature and more distilled water (538 kg) was added with stirring. The latex was discharged through cheesecloth into storage containers.

The resulting latex had a percent solids of 12.2. The isolated polymer had an inherent viscosity of 0.78 measured in acetic acid; and a glass transition temperature of +2° C.

PREPARATION 2:

Poly(butyl acrylate-co-styrene-co-sodium vinyl sulfonate-co-methacrylamide) (58.8:25.2:8:8 weight ratio)

This copolymer was prepared in a similar fashion as the copolymer of Preparation 1 except that sodium vinyl sulfonate was used as the sulfonate monomer instead of sodium 2-acrylamido-2-methylpropane sulfonate. The isolated polymer had an inherent viscosity of 0.49 measured in acetic acid and a glass transition temperature of −1° C.

PREPARATION 3:

Poly(methyl acrylate-co-styrene-co-sodium 2-acrylamido-2-methylpropane sulfonate-co-methacrylamide) (58.8:25.2:8:8 weight ratio)

This copolymer was prepared in a similar fashion as the copolymer of Preparation 1 except that methyl acrylate was used instead of butyl acrylate. The isolated polymer had an inherent viscosity of 0.72 measured in acetic acid, and a glass transition temperature of 60° C.

EXAMPLE 1:

Stability of a Composition Comprising Gelatin and Poly(butyl acrylate-co-styrene-co-sodium 2-acrylamido-2-methylpropane sulfonate-co-methacrylamide) (58.8:25.2:8.0:8.0 weight ratio)

This is a comparative example showing the improved stability of a composition of the present invention over a composition outside the teaching of this invention. Table I shows typical latex properties and stability test results of a composition comprising the sulfonate copolymer of Preparation 1 compared to the latex properties and test results of a control latex composition comprising poly(butyl acrylate-co-styrene-co-methacrylamide) (58.8:25.2:16 weight ratio) as prepared by the teaching of U.S. Pat. No. 2,739,137 (Fowler).

Light scatter was measured by diluting each of the latex copolymers 1:10 with distilled water, placing the diluted latex in a 1 cm cell and measuring the apparatus absorbance in a Backman DU spectrophotometer at 546 nm.

Tolerance of the gelatin-latex compositions to a typical organic solvent used in photographic compositions, such as methanol, was measured by incubating a mixture of 5 g gelatin, 70 ml water, 20 ml methanol and 4.3 ml latex for 4 hours at 40° C. and microscopically evaluating the simulated melt for polymer coagulation at 645×magnification. A microscopic field with a clear to fine background and few visible coagulum particles is desired. A tolerance of 20 percent or more alcohol is acceptable.

Tolerance of the compositions to dissolved inorganic salts was measured by the light scatter technique after the specified room temperature incubation of samples made up of 97.5 g latex and 2.5 g of a typical salt, such as potassium bromide. Acceptable salt tolerance is indicated by an increase in apparent absorbance of less than 50% with no caking.

TABLE I

| Polymer | Control | Example 1 |
|---|---|---|
| 20% Alcohol Tolerance | <20 | >20 |
| Background | Fine | Clear |
| Agglomerates | Loaded, 0.5–1.5 μ | Few, 0.5–1.0 μ |
| 2.5% KBr Tolerance (apparent absorbance) | | |
| 0.5 hr | 0.72 | 0.35 |
| 4 hr | 1.5 | 0.4 |
| 6 hr | 2 | 0.4 |
| 22 hr | caked | 0.44 |
| 46 hr | caked | 0.44 |
| 75 hr | caked | 0.44 |
| 99 hr | caked | 0.44 |

In addition, similar tests applied to poly(butyl acrylate-co-styrene-co-3-acryloyloxypropane-1-sulfonic acid, sodium salt-co-methacrylamide) (58.8:25.2:8:8 weight ratio), which is similar to the copolymers taught in U.S. Pat. No. 3,411,911 of Dykstra, showed that that prior art polymer was rapidly coagulated by a 2.5% KBr solution. Other copolymes which were unstable to the KBr solution include poly(butyl acrylate-co-styrene-co-styrenesulfonic acid, sodium salt-co-methacrylamide) (58.8:25.2:8:8 weight ratio) and poly(butyl methacrylate-co-sodium 2-acrylamido-2-methylpropane sulfonate-co-methacrylamide (84:8:8 weight ratio).

These results show that the composition of the present invention comprising a sulfonate copolymer has improved stability to alcohols and dissolved salts over the latex compositions taught in the art.

EXAMPLES 2–4

Compositions Comprising Latex Polymers Having Varying Amounts of Sodium 2-Acrylamido-2-Methylpropane Sulfonate Monomer These are comparative examples.

Latex polymers were prepared having varying amounts of sodium 2-acrylamido-2-methylpropane sulfonate and methacrylamide according to the procedure of Preparation 1. Compositions comprising each copolymer were evaluated for alcohol and potassium bromide tolerance using the techniques of Example 1 and compared to a control latex composition using a copolymer taught in U.S. Pat. No. 2,739,137, notably poly(butyl acrylate-co-styrene-co-methacrylamide) (58.8:25.2:16 weight ratio). The results are shown in Table II.

Table II

| Example | Control | 2 | 3 | 4 |
|---|---|---|---|---|
| Wt. percent sodium 2-acrylamido-2-methyl-propane sulfonate | 0 | 3.1 | 4.7 | 8.0 |
| Wt. percent methacrylamide | 16 | 12.9 | 11.3 | 8.0 |
| 20% Alcohol Tolerance | 20 | >20 | >20 | >20 |
| Background | Fine | Very Fine | Clear | Clear |
| Agglomerates (0.5–1.0 μ) | Loaded | Loaded | Some | Few |
| 2.5% KBr Tolerance (apparent absorbance) | | | | |
| 0.5 hr | 1.70 | 0.79 | 0.56 | 0.35 |
| 4 hr | 2.0 | 0.92 | 0.65 | 0.40 |
| 6 hr | 2.0+ | 0.94 | 0.67 | 0.40 |
| 22 hr | caked | 1.2 | 0.72 | 0.45 |
| 46 hr | caked | 1.1 | 0.73 | 0.45 |
| 75 hr | caked | 1.2 | 0.79 | 0.47 |
| 99 hr | caked | 1.2 | 0.79 | 0.48 |

Again, these examples show the improved stability to alcohol and dissolved salt of the compositions of the present invention over the control composition taught in the art. Even small amounts of sodium 2-acrylamido-2-methylpropane sulfonate in the latex produce a marked increase in the composition stability. Salt tolerance improves with increasing amounts of the sulfonate monomer in the interpolymer as indicated by lower absorbances and no caking.

EXAMPLE 5

Stability Tests for the Copolymer of Preparation 3

This is a comparative example.

The copolymer of Preparation 3 exhibited improved tolerance to alcohol and salt solutions over a control copolymer composition of poly(butyl acrylate-co-styrene-co-sodium 2-acrylamido-2-methylpropane sulfonate) (58.8:25.2:16 weight ratio) not containing methacrylamide, as indicated by the test results in Table III (the lower the absorbance, the greater the stability). The control copolymer had unacceptable tolerance to the KBr solution, i.e., an increase in absorbance >50%.

TABLE III

| | Control | Example 5 |
|---|---|---|
| 20% Alcohol Tolerance | 20 | >20 |
| Background | clear | clear |
| Agglomerates (0.5-1.0μ) | many | none |
| 2.5% KBr Tolerance (apparent absorbance) | | |
| initial | 0.20 | 0.19 |
| 0.5 hr | 0.38 | 0.25 |
| 4.0 hr | 0.63 | 0.26 |
| 8.0 hr | 0.80 | 0.26 |
| 24 hr | 1.30 | 0.26 |
| 48 hr | 1.60 | 0.26 |
| 76 hr | 1.70 | 0.26 |

This invention has been described in detail with particular reference to certain preferred embodiments thereof but it will be understood that variations and modifications can be effected within the spirit and scope of the invention.

What is claimed is:

1. A photographic composition comprising an aqueous dispersion of a light sensitive silver halide, a hydrophilic colloid and from about 10 to about 90 percent by weight of a copolymer having a glass transition temperature less than or equal to 60° comprising:
   A. from about 50 to about 70 percent by weight of an ester of an ethylenically unsaturated carboxylic acid;
   B. from about 2 to about 18 percent by weight of an amide of an ethylenically unsaturated carboxylic acid;
   C. from about 10 to about 30 percent by weight of a vinyl benzene; and
   D. from about 2 to about 18 percent by weight of a sulfonate monomer having the formula (I):

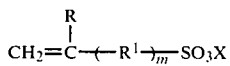

such that the total amount of amide and sulfonate monomers is less than 20 percent by weight of the total polymer weight, wherein R is hydrogen or alkyl; $R^1$ is selected from the group consisting of alkylene and

$R^2$ is amino substituted with alkyl or hydrogen, or $-(CH_2)_nO-$ wherein n is an integer from 0 to 5; m is either 0 or 1; and X is hydrogen or a monovalent cation.

2. The composition of claim 1 wherein the hydrophilic colloid is gelatin.

3. The composition of claim 1 wherein the ester is an alkyl ester of acrylic acid.

4. The composition of claim 1 wherein the amide is an amide of methacrylic acid.

5. The composition of claim 1 wherein the vinyl benzene is styrene.

6. The composition of claim 1 wherein the sulfonate has the formula

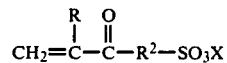

wherein R is hydrogen or methyl; $R^2$ is amino substituted with alkyl or hydrogen; and X is an alkali metal cation.

7. A photographic composition comprising an aqueous dispersion of a light sensitive silver halide, a proteinaceous hydrophilic colloid and from about 10 to about 90 percent by weight of a copolymer having a glass transition temperature less than or equal to 60° comprising:
   A. from about 50 to about 70 percent by weight of an alkyl ester of acrylic acid;
   B. from about 2 to about 18 percent by weight of an amide of methacrylic acid;
   C. from about 10 to about 36 percent by weight of styrene; and
   D. from about 2 to about 18 percent by weight of a sulfonate monomer having the formula

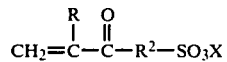

such that the total amount of amide and sulfonate monomers is less than 20 percent by weight of the total polymer weight, wherein R is hydrogen or alkyl; $R^2$ is amino substituted with alkyl or hydrogen; and X is hydrogen or an alkali metal cation.

8. The composition of claim 7 wherein the proteinaceous hydrophilic colloid is gelatin.

9. The composition of claim 7 wherein the alkali ester of acrylic acid is butyl acrylate.

10. The composition of claim 7 wherein the amide of methacrylic acid is methacrylamide.

11. The composition of claim 7 wherein the sulfonate monomer is sodium 2-acrylamido-2-methylpropane sulfonate.

12. A photographic composition comprising an aqueous dispersion of a light sensitive silver halide, gelatin and from about 10 to about 90 percent by weight of a copolymer having a glass transition temperature less than or equal to 60° comprising:
   A. from about 50 to about 70 percent by weight of butyl acrylate;

B. from about 2 to about 18 percent by weight of methacrylamide;

C. from about 10 to about 30 percent by weight of styrene; and

D. from about 2 to about 18 percent by weight of sodium 2-acrylamido-2-methylpropane sulfonate, such that the total amount of amide and sulfonate monomers is less than 20 percent by weight of the total polymer weight.

13. A photographic element which comprises a support having thereon at least one silver halide emulsion layer and at least one layer comprising an aqueous dispersion of a hydrophilic colloid and from about 10 to about 90 percent by weight of a copolymer having a glass transition temperature less than or equal to 60° C. comprising:

A. from about 50 to about 70 percent by weight of an ester of an ethylenically unsaturated carboxylic acid;

B. from about 2 to about 18 percent by weight of an amide of an ethylenically unsaturated carboxylic acid;

C. from about 10 to about 30 percent by weight of a vinyl benzene; and

D. from about 2 to about 18 percent by weight of a sulfonate monomer having the formula (I):

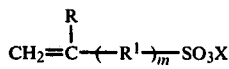

such that the total amount of amide and sulfonate monomers is less than 20 percent by weight of the total polymer weight, wherein R is hydrogen or alkyl; $R^1$ is selected from the group consisting of alkylene and

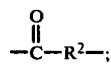

$R^2$ is amino substituted with alkyl or hydrogen, or $+CH_2)_nO-$ wherein n is an integer from 0 to 5; m is either 0 or 1; and X is hydrogen or a monovalent cation.

14. The element of claim 13 wherein the hydrophilic colloid is gelatin.

15. The element of claim 13 wherein the ester is an alkyl ester of acrylic acid.

16. The element of claim 13 wherein the amide is an amide of methacrylic acid.

17. The element of claim 13 wherein the vinyl benzene is styrene.

18. The element of claim 13 wherein the sulfonate has the formula

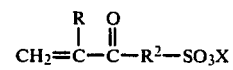

wherein R is hydrogen or methyl; $R^2$ is amino substituted with alkyl or hydrogen; and X is an alkali metal cation.

19. A photographic element which comprises a support having thereon at least one silver halide emulsion layer and at least one layer comprising an aqueous dispersion of a proteinaceous hydrophilic colloid and from about 10 to about 90 percent by weight of a copolymer having a glass transition temperature less than or equal to 60° C. comprising:

A. from about 50 to about 70 percent by weight of an alkyl ester of acrylic acid;

B. from about 2 to about 18 percent by weight of an amide of methacrylic acid;

C. from about 10 to about 30 percent by weight of styrene; and

D. from about 2 to about 18 percent by weight of a sulfonate monomer having the formula

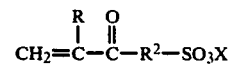

such that the total amount of amide and sulfonate monomers is less than 20 percent by weight of the total polymer weight, wherein R is hydrogen or alkyl; $R^2$ is amino substituted with alkyl or hydrogen; and X is hydrogen or an alkali metal cation.

20. The element of claim 19 wherein the proteinaceous hydrophilic colloid is gelatin.

21. The element of claim 19 wherein the alkali ester of acrylic acid is butyl acrylate.

22. The element of claim 19 wherein the amide of methacrylic acid is methacrylamide.

23. The element of claim 19 wherein the sulfonate monomer is sodium 2-acrylamido-2-methylpropane sulfonate.

24. A photographic element which comprises a support having thereon at least one silver halide emulsion layer and at least one layer comprising an aqueous dispersion of gelatin and from about 10 to about 90 percent by weight of a copolymer having a glass transition temperature less than or equal to 60° C. comprising:

A. from about 50 to about 70 percent by weight of butyl acrylate;

B. from about 2 to about 18 percent by weight of methacrylamide;

C. from about 10 to about 30 percent by weight of styrene; and

D. from about 2 to about 18 percent by weight of sodium 2-acrylamido-2-methylpropane sulfonate, such that the total amount of amide and sulfonate monomers is less than 20 percent by weight of the total polymer weight.

* * * * *